US012598416B2

(12) United States Patent
Wang

(10) Patent No.: US 12,598,416 B2
(45) Date of Patent: Apr. 7, 2026

(54) VIBRATION EXCITER WITH ELASTIC BRACKETS

(71) Applicant: NINGBO KEPO ELECTRONICS CO., LTD., Ningbo (CN)

(72) Inventor: Bing Wang, Ningbo (CN)

(73) Assignee: NINGBO KEPO ELECTRONICS CO., LTD., Ningbo (CN)

( * ) Notice: Subject to any disclaimer, the term of this patent is extended or adjusted under 35 U.S.C. 154(b) by 152 days.

(21) Appl. No.: 18/711,421

(22) PCT Filed: Jan. 20, 2022

(86) PCT No.: PCT/CN2022/072948
§ 371 (c)(1),
(2) Date: May 17, 2024

(87) PCT Pub. No.: WO2023/092847
PCT Pub. Date: Jun. 1, 2023

(65) Prior Publication Data

US 2025/0056154 A1 Feb. 13, 2025

(30) Foreign Application Priority Data

Nov. 26, 2021 (CN) ........................ 202111422543.9

(51) Int. Cl.
*H04R 1/28* (2006.01)
*H04R 7/12* (2006.01)
(Continued)

(52) U.S. Cl.
CPC ............. *H04R 1/2892* (2013.01); *H04R 7/12* (2013.01); *H04R 9/025* (2013.01); *H04R 9/045* (2013.01)

(58) Field of Classification Search
CPC .......... H04R 9/045; H04R 9/025; H04R 7/12; H04R 1/2892
(Continued)

(56) References Cited

U.S. PATENT DOCUMENTS 9,883,290 B2 * 1/2018 Timothy ................ H04R 9/045
2021/0409870 A1 * 12/2021 Takano .................... H04R 9/06

FOREIGN PATENT DOCUMENTS

CN 101150884 3/2008
CN 104507019 4/2015
(Continued)

*Primary Examiner* — Sean H Nguyen
(74) *Attorney, Agent, or Firm* — Jiwen Chen; Joywin IP Law PLLC

(57) ABSTRACT

A vibration exciter having an elastic support, comprising a cavity cover (1) and a vibration base (5). One side of the cavity cover (1) is provided with a PCB assembly plate (8), and a PCB is provided in the PCB assembly plate (8). An excitation signal is input into a voice coil (7) provided on the periphery of a main and auxiliary magnet (6) by means of the PCB, so that the vibration base (5) provided on the periphery of the voice coil (7) is driven, and the vibration base (5) is connected to a supporting plate (4) so that vibration is delivered to the supporting plate (4) and then is delivered to the elastic support (3) by means of the supporting plate (4), the cavity cover (1) is driven to vibrate, and a screen connected to the bottom of the cavity cover (1) is driven to vibrate. Such a structure effectively reduces a resonant frequency of the exciter, and improves the amplitude of the exciter; moreover, different structures are stably connected, and the service life of a device is prolonged.

10 Claims, 2 Drawing Sheets

(51) Int. Cl.
*H04R 9/02* (2006.01)
*H04R 9/04* (2006.01)

(58) Field of Classification Search
USPC .......................................................... 381/400
See application file for complete search history.

(56) References Cited

FOREIGN PATENT DOCUMENTS

| | | | | | |
|---|---|---|---|---|---|
| CN | 206835357 | | | 1/2018 | |
| CN | 110177322 | | | 8/2019 | |
| CN | 210183525 | | | 3/2020 | |
| CN | 111031451 | A | * | 4/2020 | ............. H04R 9/045 |
| CN | 111817526 | B | * | 10/2021 | ............. B06B 1/045 |
| JP | 2007124366 | | | 5/2007 | |

* cited by examiner

VIBRATION EXCITER WITH ELASTIC BRACKETS

This is a U.S. national stage application of PCT Application No. PCT/CN2022/072948 under 35 U.S.C. 371, filed Jan. 20, 2022 in Chinese, claiming priority of Chinese Application No. 202111422543.9, filed Nov. 26, 2021, all of which are hereby incorporated by reference.

TECHNICAL FIELD OF THE INVENTION

The present invention relates to an exciter, and in particular to a vibration exciter with elastic brackets.

BACKGROUND OF THE INVENTION

In the prior art, the vibration exciter is a system mainly consisting of a vibration generator, a control and measurement device and other auxiliary devices, and is a device which obtains mechanical vibration by electric, electro-hydraulic, piezoelectric or other principles. Its principle is to input an excitation signal into a coil arranged in the magnetic field to drive an operating platform connected to the coil.

In the patent document 201410837936.X, in the tactile speaker and display component, a fitting plate connected to brackets and fitted with a vibrating object is provided, and a vibration system is arranged on the fitting plate. A flexible frame capable of vibrating is arranged between the brackets. A magnetic circuit system that cooperates with the vibration system is arranged in the flexible frame. By optimizing the structure of the tactile speaker, the tactile speaker has a lower resonance frequency and a higher amplitude, and the vibration sensation of the speaker is effectively improved. However, the disadvantage lies in the flexible frame made of a nylon 12 material. Due to its low structural stiffness and damping, the nylon 12 material is easy to produce vibration that is large in amplitude and difficult to attenuate. Thus, long-term vibration will cause structural fatigue damage and shorten the life of the equipment.

SUMMARY OF THE INVENTION

In order to solve the above problem, the present invention provides a vibration exciter with elastic brackets, which reduces the resonance frequency of the exciter and improves the amplitude of the exciter and the stability of interconnection between components.

In order to achieve the above object, the present invention designs a vibration exciter with elastic brackets, mainly including a cavity cover and a vibration seat, wherein support seats are symmetrically arranged on two sides of the cavity cover, elastic brackets are arranged on inner sides of the support seats, and a support plate is fixed between the elastic brackets; the vibration seat is arranged upside down above the cavity cover; an upper bottom surface of the vibration seat is in fitting connection to a lower bottom surface of the support plate; the interior of the vibration seat is cylindrical and hollow, and a main/secondary magnet is arranged inside the vibration seat; a voice coil is arranged around the main/secondary magnet; and, the bottom of the voice coil is fixed with a through hole formed in a middle portion of the cavity cover. In the arrangement of this structure, by sheathing the elastic brackets in the support seats on two sides of the cavity cover and arranging the support plate between the elastic brackets, the vibration is transferred to the support plate and then transferred to the elastic brackets through the support plate, so as to drive the cavity cover to vibrate.

Further, a cylindrical pin is provided on an upper surface of the bottom of the vibration seat, and the cylindrical pin is riveted with a through hole formed in a middle portion of the support plate. In this structure, the support plate is further stably and effectively fixed on the support seats in a riveted manner.

Furthermore, connecting grooves fitted with the support plate in an insertion manner are formed in upper portions of the opposite upper sides of the two elastic brackets, two ends of the support plate are inserted between the two connecting grooves in an embedded manner, and the support plate is made of an elastic material by integral injection molding. In this structure, the support plate is connected to the inner sides of the two elastic brackets in an embedded manner, so that the strength connection between the elastic brackets and the support plate is enhanced. Moreover, with regard to the elastic brackets and the support plate, the support plate may also be further fixed and arranged on the elastic brackets through an adhesive.

Furthermore, the support seats are arranged on the outer sides of the elastic brackets in a semi-enclosed manner, and spacing positions convenient for mounting the elastic brackets are formed in the middle portions of the outer walls of the support brackets located on the short edges of the cavity cover, and extension portions for fixing the elastic brackets extend from the outer walls of the support seats located on the long edges of the cavity cover toward the cavity cover; and, the bottoms of the elastic brackets are fixedly connected to the cavity cover. In this structure, by designing the shape the support seats, the elastic brackets are limited in three directions, and the bottoms of the elastic brackets are fitted and fixed with the cavity cover, so that the mounting positions of the elastic brackets are effectively determined, and the displacement of the elastic brackets on the horizontal plane are limited, and the strength of connection between the elastic brackets and the support seats and the cavity cover is ensured.

Furthermore, the bottoms of the elastic brackets are fixed to the cavity cover in an adhesion manner; the elastic brackets are sandglass-shaped or hourglass-shaped as a whole, and sandglass-shaped slots matched with the shape are provided on the inner sides of the elastic brackets; and, the elastic brackets are made of an elastic material by integral injection molding. In this structure, by designing the shape of the elastic brackets, the performance of the elastic brackets is ensured, the resonance frequency of the exciter can be reduced, and the amplitude of the exciter can be improved. Moreover, in the adhesion manner, the connection effectiveness is ensured, the structure is simplified, and the assembly difficulty is reduced.

Furthermore, a printed circuit board (PCB) assembly plate extends outward from one side of the cavity cover, and a PCB circuit board is arranged on the PCB assembly plate. In this structure, by arranging the PCB circuit board, an excitation signal is input into the voice coil arranged around the main/secondary magnet, so as to drive the vibration seat.

Furthermore, an evading groove for evading the PCB circuit board is formed on the bottom of the elastic bracket on the side of the cavity cover provided with the PCB assembly plate; a boss or an extrusion is provided on an outer edge of the through hole formed in the middle portion of the cavity cover; and, the outer wall of the boss is fitted and fixed with the inner wall of the voice coil. In this structure, by forming the evading groove for evading the PCB circuit board on the bottom of the elastic bracket, the elastic brackets are prevented from colliding with the PCB circuit board when they vibrate up and down, thus damaging the PCB circuit. Moreover, the voice coil is effectively supported and fixed by the sidewall of the boss on the cavity cover.

In the vibration exciter with elastic brackets designed by the present invention, an excitation signal is input into the voice coil arranged around the main/secondary magnet through the PCB circuit board so as to drive the vibration seat to move, and the vibration is transferred to the elastic brackets through the support plate to eventually drive the cavity cover to vibrate. This structure has the following characteristics. The mode in which the elastic sheet connected to the vibration seat is used as a main vibration transfer mechanism in the prior art is abandoned, the material of the elastic sheet connected to the vibration seat is changed to a rubber material with higher rigidity, and the rigid brackets in the prior art are changed to elastic brackets, so that the lateral elastic load of the elastic brackets is effectively reduced, the deformation of the elastic brackets is enhanced, the resonance frequency of the exciter is finally effectively reduced, and the amplitude of the exciter is improved. Moreover, the connection between different structures is stable, and the service life of the device is prolonged.

DETAILED DESCRIPTION OF THE INVENTION

To further explain the technical means used to achieve the intended inventive objective and the effects thereof in the present invention, the specific implementations, structures, features and effects thereof of the present invention will be described below in detail by preferred embodiments with reference to the accompanying drawings.

Embodiment 1

Figure 1:
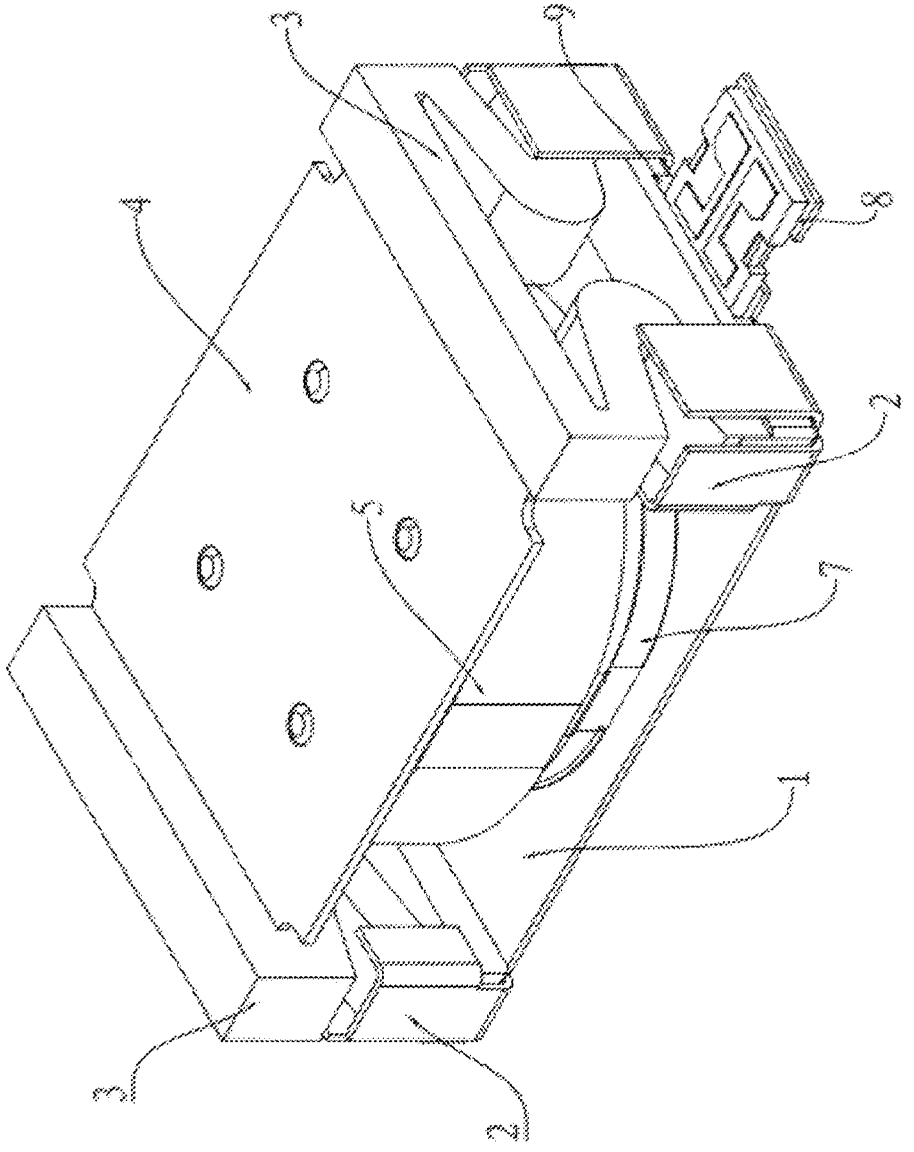
FIG. 1 is an axonometric view of the vibration exciter with elastic brackets.
Figure 2:
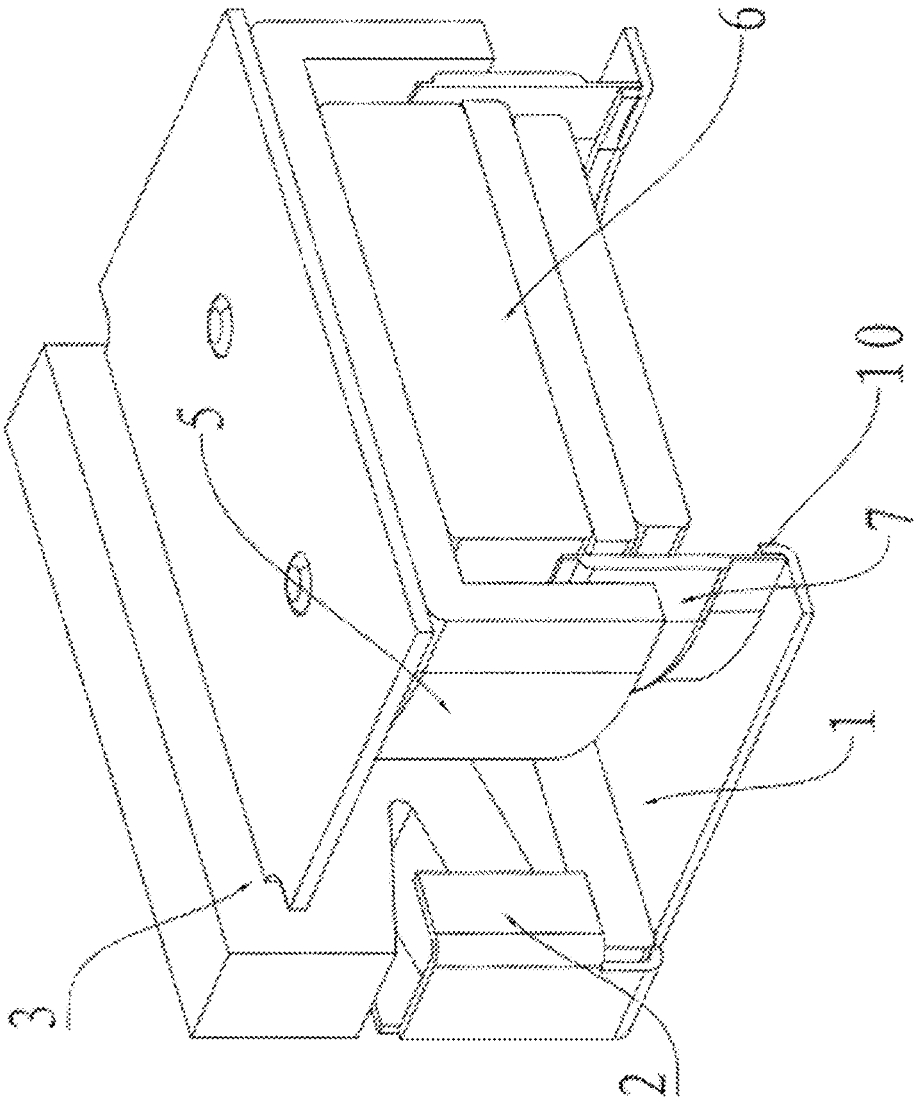
FIG. 2 is a sectional view of the vibration exciter with elastic brackets.

As shown in FIGS. 1 and 2, the vibration exciter with elastic brackets described in this embodiment mainly includes a cavity cover 1 and a vibration seat 5. Support seats 2 extending upward are arranged on the outer edge of the cavity cover 1, and the support seats 2 are symmetrically arranged on two sides of the cavity cover 1. Support brackets 3 are arranged on the inner sides of the support seat 2 in a semi-enclosed manner. The elastic brackets 3 are made of an elastic material by integral injection molding. The elastic brackets 3 are sandglass-shaped as a whole, sandglass-shaped slots matched with the shape are formed on the inner sides of the elastic brackets 3, and connecting grooves are formed above the slots on the inner sides of the elastic brackets 3. A support plate 4 is fixed in the connecting grooves. A cylindrical column arranged on the upper bottom surface of the vibration seat 5 is fitted and fixed with a through hole formed in the middle portion of the support plate 4. The vibration seat 5 is arranged upside down on the upper top surface of the cavity cover 1, and the interior of the vibration seat 5 is cylindrical and hollow. A main/secondary magnet 6 is arranged inside the vibration seat 5, a voice coil 7 is arranged around the main/secondary magnet 6, and the bottom of the voice coil 7 is fitted and fixed with a through hole formed in the middle portion of the cavity cover 1.

As shown in FIG. 1, a PCB assembly plate 8 extends outward from one side of the cavity cover 1, and a PCB circuit board is arranged on the PCB assembly plate 8.

An evading groove 9 for evading the PCB circuit board is formed on the bottom of the elastic bracket 3 on the side of the cavity cover 1 provided with the PCB assembly plate 8.

Embodiment 2

As shown in FIGS. 1 and 2, the vibration exciter with elastic brackets described in this embodiment mainly includes a cavity cover 1 and a vibration seat 5. Support seats 2 are arranged on two sides of the cavity cover 1, and support brackets 3 are arranged on the inner sides of the support seat 2. The elastic brackets 3 are made of an elastic material by integral injection molding. The elastic brackets 3 are fixed to the supper top surface of the cavity cover 1 in an adhesion manner. Sandglass-shaped slots are formed on the inner sides of the elastic brackets 3, and a support plate 4 is arranged in connecting grooves above the slots on the inner sides of the elastic brackets 3 in an embedded manner. With regard to the elastic brackets 3 and the support plate 4, the support plate 4 is further adhered and fixed to the outer surfaces of the elastic brackets 3 by an adhesive. The vibration seat 5 is arranged upside down on the upper top surface of the cavity cover 1. A cylindrical column arranged in the middle portion of the upper bottom surface of the vibration seat 5 is fitted and fixed with a through hole formed in the middle portion of the support plate 4, and the interior of the vibration seat 5 is cylindrical and hollow. A main/secondary magnet 6 is arranged inside the vibration seat 5, and a voice coil 7 is arranged around the main/secondary magnet 6. A boss 10 is provided on an outer edge of a through hole formed in the middle portion of the cavity cover 1, and the outer wall of the boss is fitted and fixed with the inner wall of the voice coil 7.

As shown in FIG. 1, a PCB assembly plate 8 extends outward from one side of the cavity cover 1, and a PCB circuit board is arranged on the PCB assembly plate 8.

An evading groove 9 for evading the PCB circuit board is formed on the bottom of the elastic bracket 3 on the side of the cavity cover 1 provided with the PCB assembly plate 8.

As shown in FIG. 2, the main/secondary magnet 6 is divided into a main magnet and a secondary magnet, and the main magnet and the second magnetic are adhered and fixed by a clamping plate.

The foregoing description merely shows the preferred embodiments of the present invention and is not intended to limit the present invention in any form. Although the present invention has been disclosed above by the preferred embodiments, the preferred embodiments are not intended to limit the present invention. Any person of ordinary skill in the art can make some changes or modifications to the technical contents disclosed above to form equivalent embodiments with equivalent changes, without departing from the scope of the technical solutions of the present invention. Any simple alterations, equivalent changes and modifications made to the above embodiments according to the technical essence of the present invention without departing from the technical solutions of the present invention shall fall into the scope of the technical solutions of the present invention.

The invention claimed is:

1. A vibration exciter with elastic brackets, comprising a cavity cover (1) and a vibration seat (5), wherein support seats are symmetrically arranged on two sides of the cavity cover (1), elastic brackets (3) are arranged on inner sides of the support seats (2), and a support plate (4) is fixed between the elastic brackets (3); the vibration seat (5) is arranged upside down above the cavity cover (1); an upper bottom surface of the vibration seat (5) is in fitting connection to a lower bottom surface of the support plate (4); an interior of the vibration seat (5) is cylindrical and hollow, and a main/secondary magnet (6) is arranged inside the vibration seat (5); a voice coil (7) is arranged around the main/secondary magnet (6); and, a bottom of the voice coil (7) is fixed with a through hole formed in a middle portion of the cavity cover (1).

2. The vibration exciter with elastic brackets according to claim 1, wherein a cylindrical pin is provided on an upper surface of the bottom of the vibration seat (5), and the cylindrical pin is riveted with a through hole formed in a middle portion of the support plate (4).

3. The vibration exciter with elastic brackets according to claim 1, wherein connecting grooves fitted with the support plate (4) in an insertion manner are formed in upper portions of opposite upper sides of the two elastic brackets (3), two ends of the support plate (4) are inserted between the two connecting grooves in an embedded manner, and the support plate (4) is made of an elastic material by integral injection molding.

4. The vibration exciter with elastic brackets according to claim 3, wherein the support seats (2) are arranged on outer sides of the elastic brackets (3) in a semi-enclosed manner, and spacing positions convenient for mounting the elastic brackets (3) are formed in middle portions of outer walls of the support brackets (2) located on short edges of the cavity cover (1), and extension portions for fixing the elastic brackets (3) extend from the outer walls of the support seats (2) located on long edges of the cavity cover (1) toward the cavity cover (1); and, bottoms of the elastic brackets (3) are fixedly connected to the cavity cover (1).

5. The vibration exciter with elastic brackets according to claim 4, wherein the bottoms of the elastic brackets (3) are fixed to the cavity cover (1) in an adhesion manner; the elastic brackets (3) are sandglass-shaped as a whole, and sandglass-shaped slots matched with the sandglass shape are provided on inner sides of the elastic brackets (3); and, the elastic brackets (3) are made of an elastic material by integral injection molding.

6. The vibration exciter with elastic brackets according to claim 5, wherein a printed circuit board (PCB) assembly plate (8) extends outward from one side of the cavity cover (1), and a PCB circuit board is arranged on the PCB assembly plate (8); an evading groove (9) for evading the PCB circuit board is formed on the bottom of the elastic bracket (3) on the side of the cavity cover (1) provided with the PCB assembly plate (8); a boss (10) is provided on an outer edge of the through hole formed in the middle portion of the cavity cover (1); and, an outer wall of the boss is fitted and fixed with an inner wall of the voice coil (7).

7. The vibration exciter with elastic brackets according to claim 3, wherein bottoms of the elastic brackets (3) are fixed to the cavity cover (1) in an adhesion manner; the elastic brackets (3) are sandglass-shaped as a whole, and sandglass-shaped slots matched with the sandglass shape are provided on inner sides of the elastic brackets (3); and, the elastic brackets (3) are made of an elastic material by integral injection molding.

8. The vibration exciter with elastic brackets according to claim 1, wherein the support seats (2) are arranged on outer sides of the elastic brackets (3) in a semi-enclosed manner, and spacing positions convenient for mounting the elastic brackets (3) are formed in middle portions of outer walls of the support brackets (2) located on short edges of the cavity cover (1), and extension portions for fixing the elastic brackets (3) extend from the outer walls of the support seats (2) located on long edges of the cavity cover (1) toward the cavity cover (1); and, bottoms of the elastic brackets (3) are fixedly connected to the cavity cover (1).

9. The vibration exciter with elastic brackets according to claim 8, wherein the bottoms of the elastic brackets (3) are fixed to the cavity cover (1) in an adhesion manner; the elastic brackets (3) are sandglass-shaped as a whole, and sandglass-shaped slots matched with the sandglass shape are provided on inner sides of the elastic brackets (3); and, the elastic brackets (3) are made of an elastic material by integral injection molding.

10. The vibration exciter with elastic brackets according to claim 1, wherein bottoms of the elastic brackets (3) are fixed to the cavity cover (1) in an adhesion manner; the elastic brackets (3) are sandglass-shaped as a whole, and sandglass-shaped slots matched with the sandglass shape are provided on inner sides of the elastic brackets (3); and, the elastic brackets (3) are made of an elastic material by integral injection molding.

* * * * *